US012620414B2

(12) United States Patent
Miyamura et al.

(10) Patent No.: US 12,620,414 B2
(45) Date of Patent: May 5, 2026

(54) TAPE DRIVE ERROR RECOVERY PROCEDURE SELECTION BASED ON HUMIDITY

(71) Applicant: International Business Machines Corporation, Armonk, NY (US)

(72) Inventors: Tsuyoshi Miyamura, Yokohama (JP); Setsuko Masuda, Toshima-ku (JP); Tatsuki Sawada, Matsudo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/099,833

(22) Filed: Jan. 20, 2023

(65) Prior Publication Data

US 2024/0249750 A1     Jul. 25, 2024

(51) Int. Cl.

| | |
|---|---|
| *G11B 5/00* | (2006.01) |
| *G11B 5/008* | (2006.01) |
| *G11B 5/41* | (2006.01) |
| *G11B 15/05* | (2006.01) |
| *G11B 20/18* | (2006.01) |
| *G11B 23/50* | (2006.01) |

(52) U.S. Cl.
CPC ........ *G11B 23/502* (2013.01); *G11B 5/00813* (2013.01); *G11B 15/05* (2013.01); *G11B 20/18* (2013.01)

(58) Field of Classification Search
CPC ......... G11B 5/40; G11B 5/676; G11B 5/7085; G11B 5/7356; G11B 5/10813; G11B 5/5543; G11B 5/41; G11B 23/502; G11B 23/049; G11B 33/1406; G11B 5/00813; G11B 15/6835; G11B 15/68

USPC .............................. 360/31, 137, 128, 130.21
See application file for complete search history.

(56) References Cited

U.S. PATENT DOCUMENTS

| | | | |
|---|---|---|---|
| 5,406,425 A | 4/1995 | Johnston et al. | |
| 8,477,448 B2 * | 7/2013 | Thompson ............. | G11B 15/68 360/92.1 |
| 10,813,252 B2 | 10/2020 | Frink et al. | |
| 11,341,994 B1 | 5/2022 | Goker et al. | |
| 2016/0019927 A1 | 1/2016 | Bayang et al. | |
| 2018/0240483 A1 | 8/2018 | Nylander-Hill | |

FOREIGN PATENT DOCUMENTS

| | | |
|---|---|---|
| CN | 108844570 B | 4/2020 |
| JP | H06510147 A | 11/1994 |
| JP | 2005259198 A | 9/2005 |
| JP | 2019193829 A | 11/2019 |

(Continued)

*Primary Examiner* — Nabil Z Hindi
(74) *Attorney, Agent, or Firm* — Michael O'Keefe

(57) ABSTRACT

In one general embodiment, an apparatus includes a magnetic head, and a controller coupled to the magnetic head, the controller being configured to perform a method that includes measuring humidity in a vicinity of the apparatus in response to detection of an error while performing a data operation on a magnetic recording tape. An error recovery procedure to remove debris on the tape is executed in response to detection of an error and the measured humidity exceeding a predefined upper limit value. An error recovery procedure to remove debris adhering to the magnetic head is executed in response to detection of an error and the measured humidity being below a predefined lower limit value.

20 Claims, 12 Drawing Sheets

(56)     References Cited

FOREIGN PATENT DOCUMENTS

| JP | 2020504414 | A | 2/2020 |
| JP | 2022120687 | A | 8/2022 |
| WO | 9303437 | A1 | 2/1993 |
| WO | 2019193829 | A1 | 10/2019 |

* cited by examiner

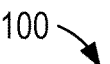

100

CLIENT COMPUTER 101

PROCESSOR SET 110

PROCESSING CIRCUITRY 120 CACHE 121

COMMUNICATION FABRIC 111

VOLATILE MEMORY 112

PERSISTENT STORAGE 113

OPERATING SYSTEM 122

ERROR RECOVERY PROCEDURE SELECTION
CODE

200

PERIPHERAL DEVICE SET 114

UI DEVICE SET 123 STORAGE 124 IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141 HOST PHYSICAL MACHINE SET 142

VIRTUAL MACHINE SET 143 CONTAINER SET 144

FIG. 1

TAPE DRIVE ERROR RECOVERY PROCEDURE SELECTION BASED ON HUMIDITY

BACKGROUND

The present invention relates to data storage systems, and more particularly, this invention relates to selecting error recovery procedure(s) based on humidity.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability and debris.

SUMMARY

An apparatus, in accordance with one embodiment, includes a magnetic head, and a controller coupled to the magnetic head, the controller being configured to perform a method that includes measuring humidity in a vicinity of the apparatus in response to detection of an error while performing a data operation on a magnetic recording tape. An error recovery procedure to remove debris on the tape is executed in response to detection of an error and the measured humidity exceeding a predefined upper limit value. An error recovery procedure to remove debris adhering to the magnetic head is executed in response to detection of an error and the measured humidity being below a predefined lower limit value.

A method, in accordance with one embodiment, includes measuring humidity in a vicinity of a tape drive in response to occurrence of an error while performing a data operation on a magnetic recording tape. An error recovery procedure to remove debris on the tape is executed in response to detection of an error and the measured humidity exceeding a predefined upper limit value. An error recovery procedure to remove debris adhering to the magnetic head is executed in response to detection of an error and the measured humidity being below a predefined lower limit value.

A computer program product for selecting an error recovery procedure, in accordance with one embodiment, includes one or more computer readable storage media, and program instructions collectively stored on the one or more computer readable storage media. The program instructions include program instructions to measure humidity in a vicinity of a tape drive in response to occurrence of an error while performing a data operation on a magnetic recording tape, program instructions to execute an error recovery procedure to remove debris on the tape in response to the measured humidity exceeding a predefined upper limit value, and program instructions to execute an error recovery procedure to remove debris adhering to a magnetic head of the tape drive in response to the measured humidity being below a predefined lower limit value.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2A:
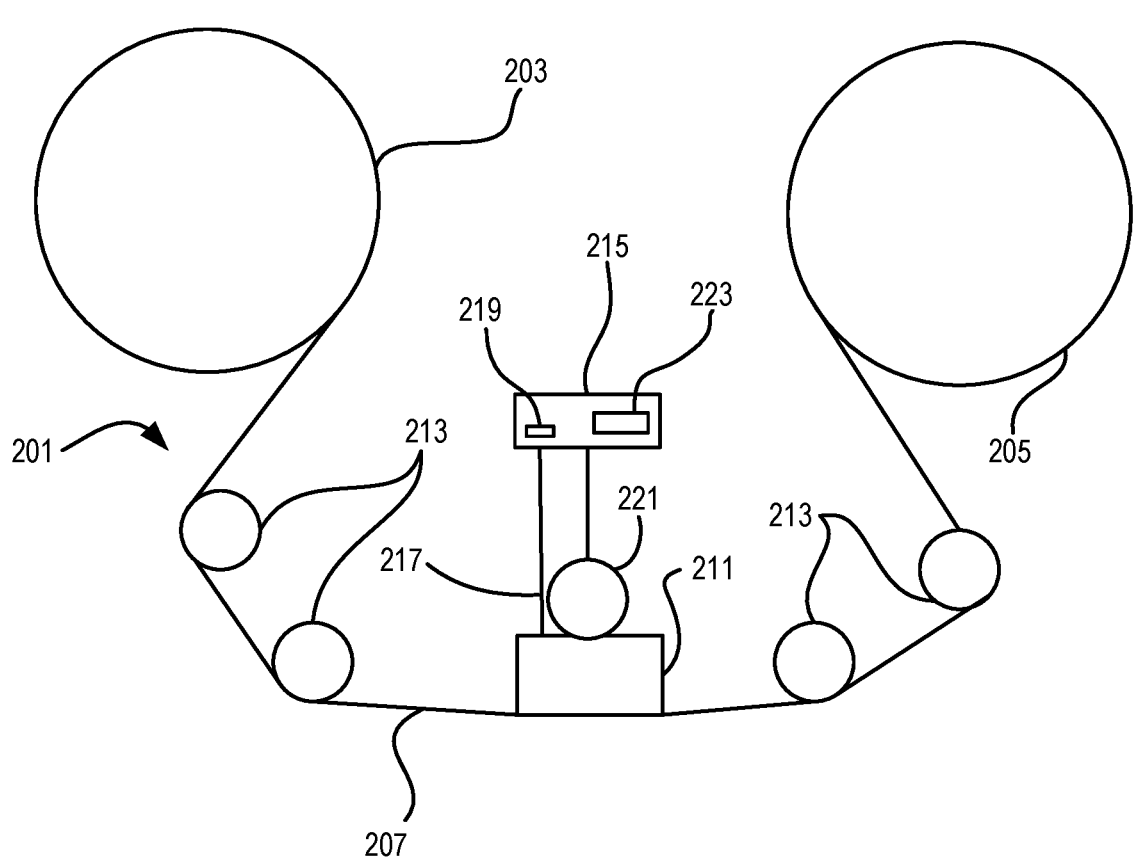
FIG. 2A is a schematic diagram of a simplified tape drive system, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic head, and a controller coupled to the magnetic head, the controller being configured to perform a method that includes measuring humidity in a vicinity of the apparatus in response to detection of an error while performing a data operation on a magnetic recording tape. An error recovery procedure to remove debris on the tape is executed in response to detection of an error and the measured humidity exceeding a predefined upper limit value. An error recovery procedure to remove debris adhering to the magnetic head is executed in response to detection of an error and the measured humidity being below a predefined lower limit value.

In another general embodiment, a method includes measuring humidity in a vicinity of a tape drive in response to occurrence of an error while performing a data operation on a magnetic recording tape. An error recovery procedure to remove debris on the tape is executed in response to detection of an error and the measured humidity exceeding a predefined upper limit value. An error recovery procedure to remove debris adhering to the magnetic head is executed in response to detection of an error and the measured humidity being below a predefined lower limit value.

In another general embodiment, a computer program product for selecting an error recovery procedure includes one or more computer readable storage media, and program instructions collectively stored on the one or more computer readable storage media. The program instructions include program instructions to measure humidity in a vicinity of a tape drive in response to occurrence of an error while performing a data operation on a magnetic recording tape, program instructions to execute an error recovery procedure to remove debris on the tape in response to the measured humidity exceeding a predefined upper limit value, and program instructions to execute an error recovery procedure to remove debris adhering to a magnetic head of the tape drive in response to the measured humidity being below a predefined lower limit value.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as error recovery procedure selection code in block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
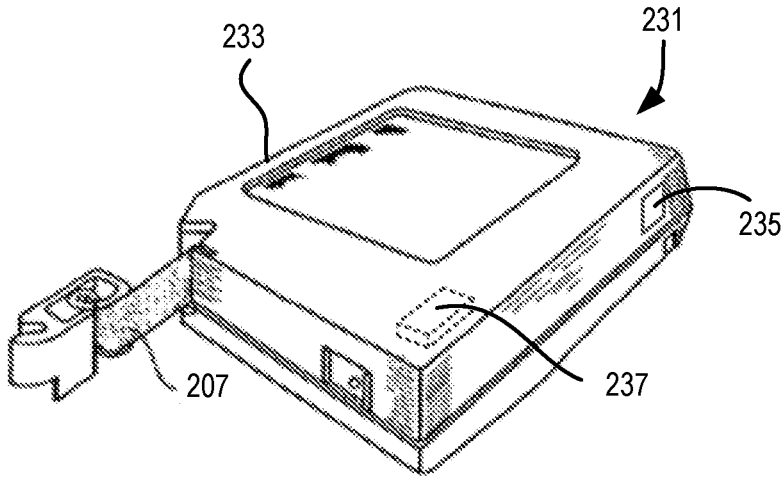
FIG. 2B is a schematic diagram of a tape cartridge, in accordance with one embodiment.

FIG. 2B illustrates an exemplary tape cartridge 231, according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
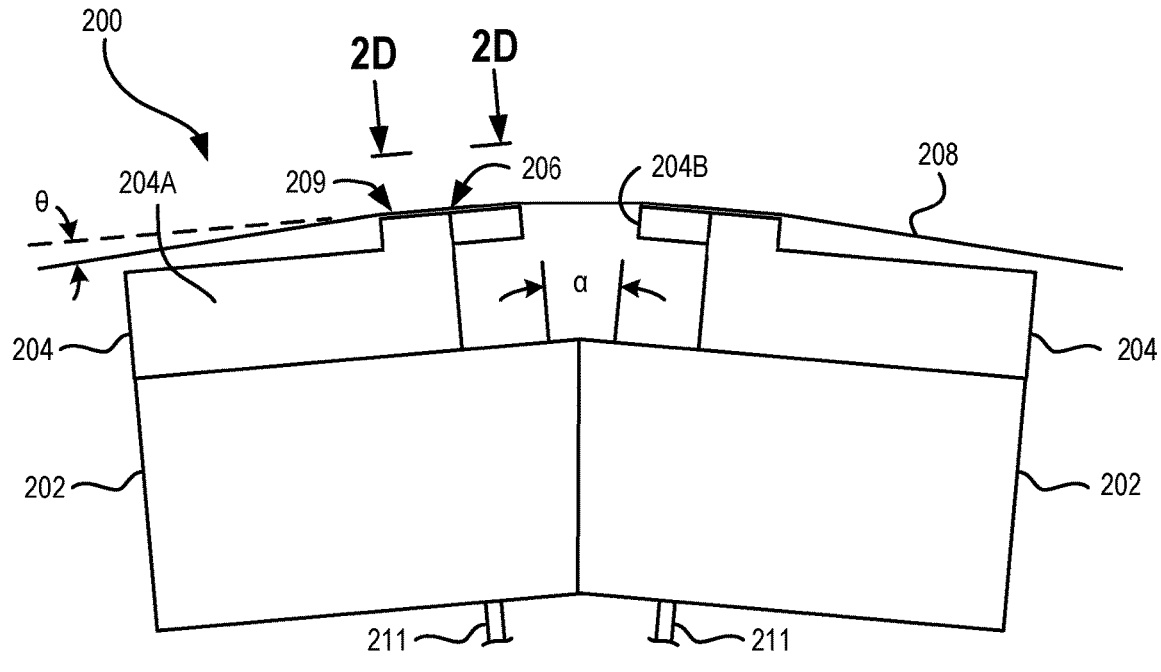
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
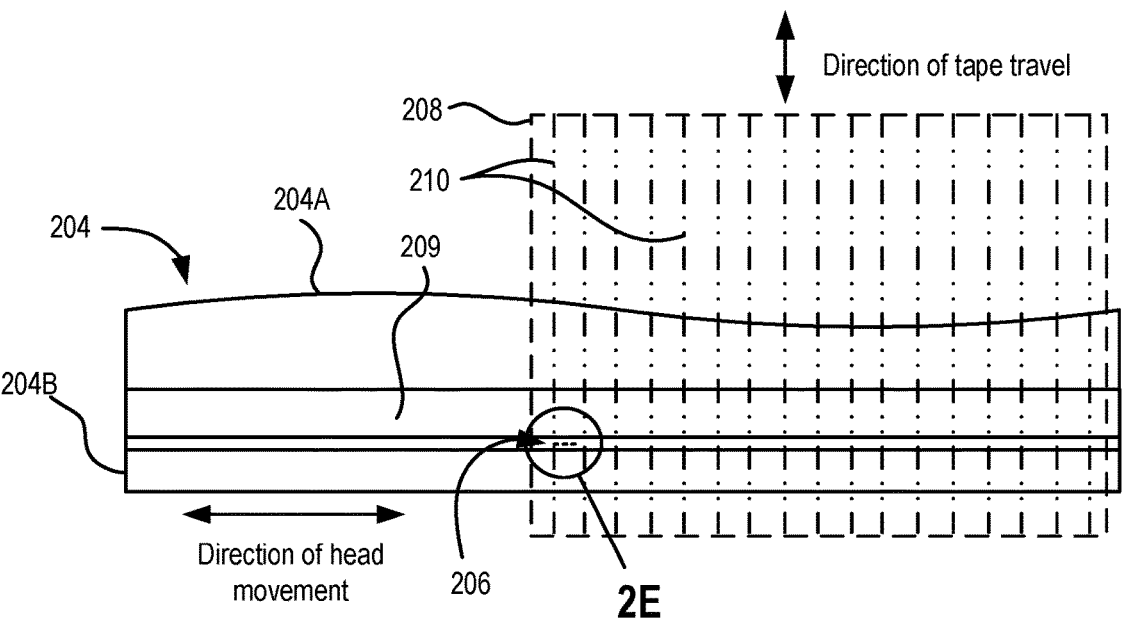
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2E:
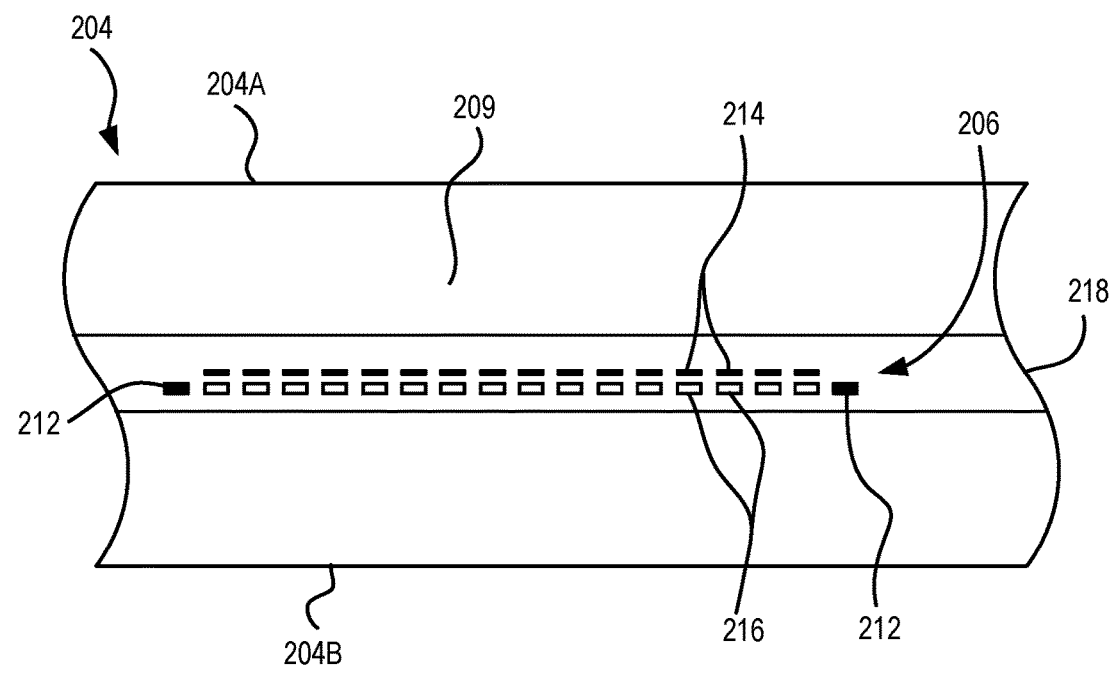
FIG. 2E is a detailed view taken from Circle 2E of FIG. 2D.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

Figure 2F:
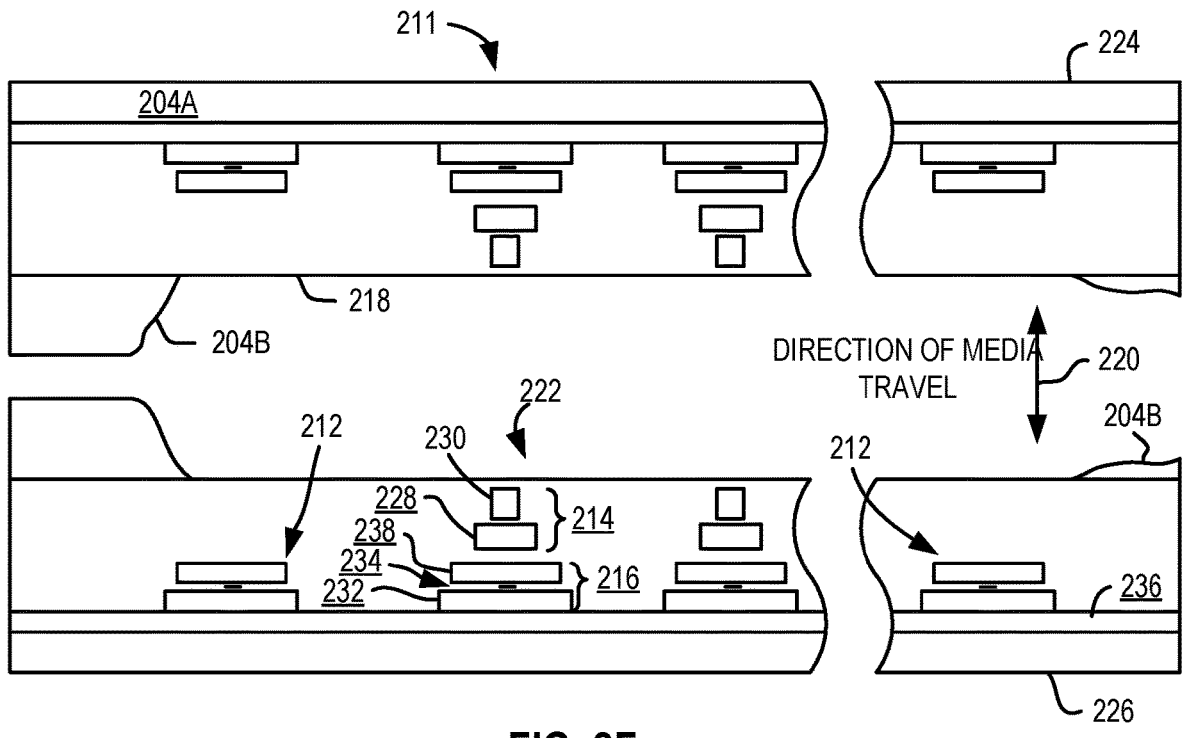
FIG. 2F is a detailed view of a partial tape bearing surface of a pair of modules.

FIG. 2F shows a partial tape bearing surface view of complementary modules of a magnetic tape head 211, according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
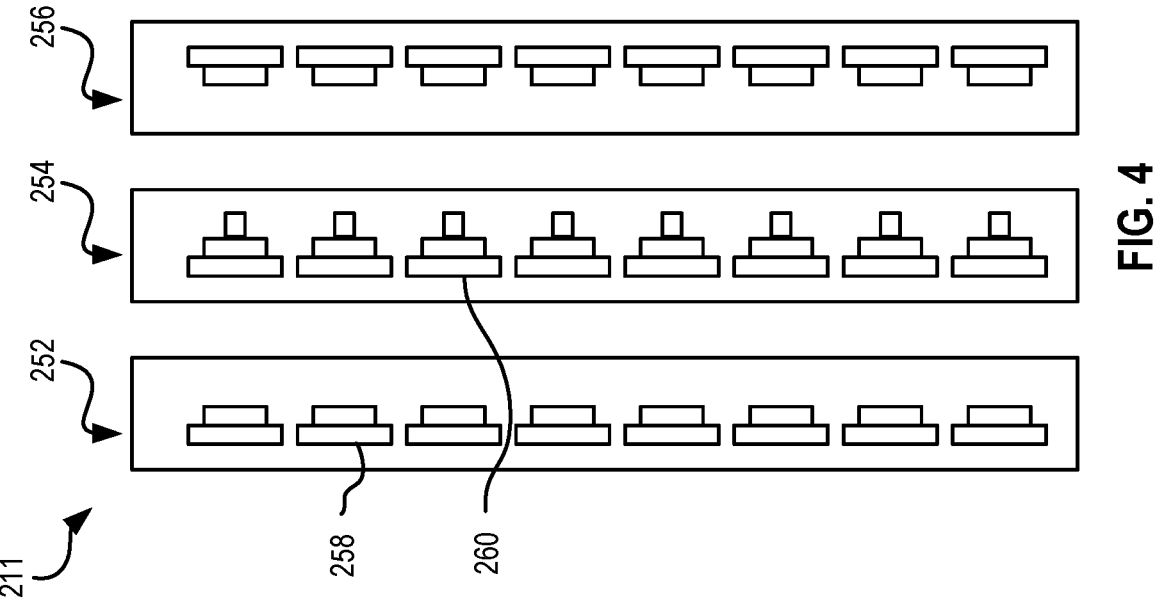
FIG. 4 is a partial tape bearing surface view of a magnetic head having a read-write-read configuration, in accordance with one embodiment.
Figure 3:
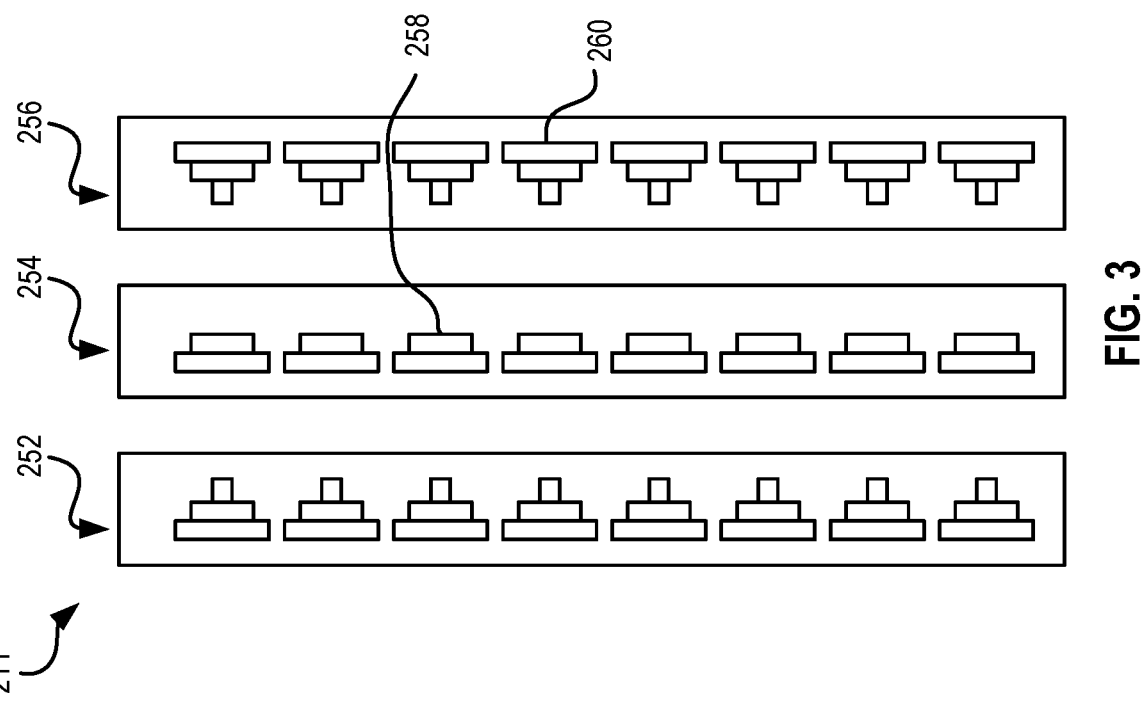
FIG. 3 is a partial tape bearing surface view of a magnetic head having a write-read-write configuration, in accordance with one embodiment.

The configuration of the tape head 211, according to one embodiment, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
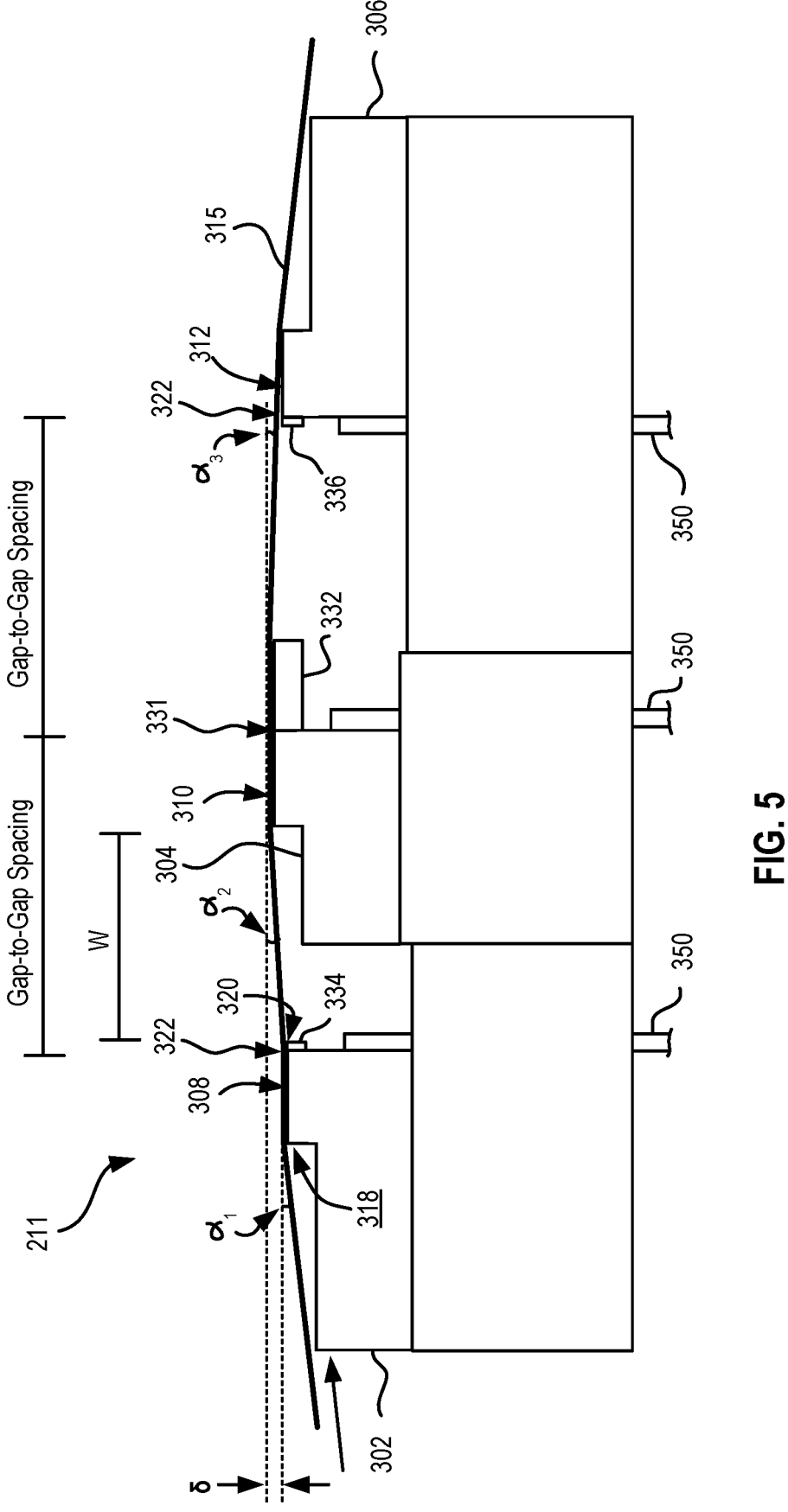
FIG. 5 is a side view of a magnetic tape head with three modules where the modules all generally lie along about parallel planes, in accordance with one embodiment.

FIG. 5 illustrates a magnetic head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing." The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
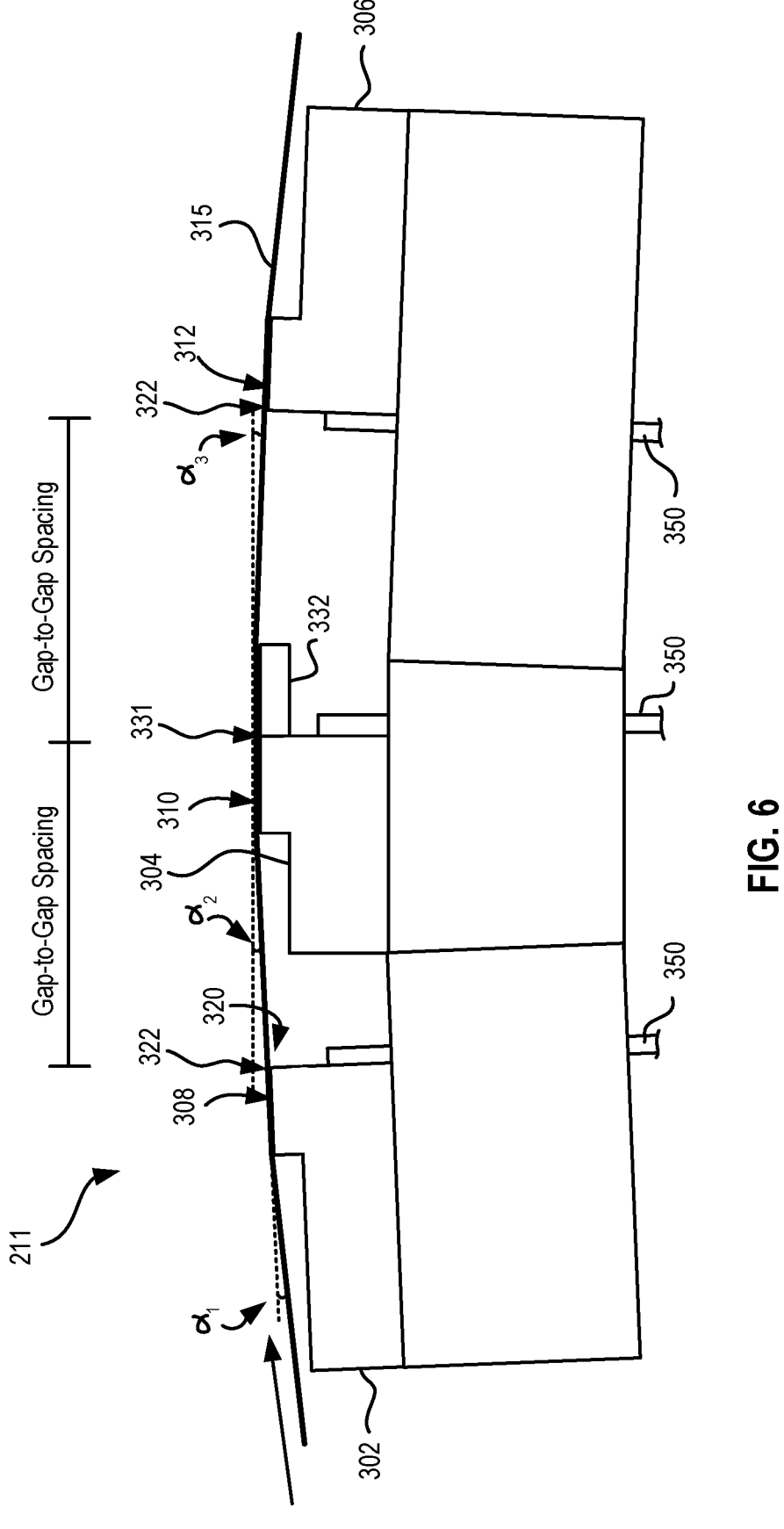
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha 2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
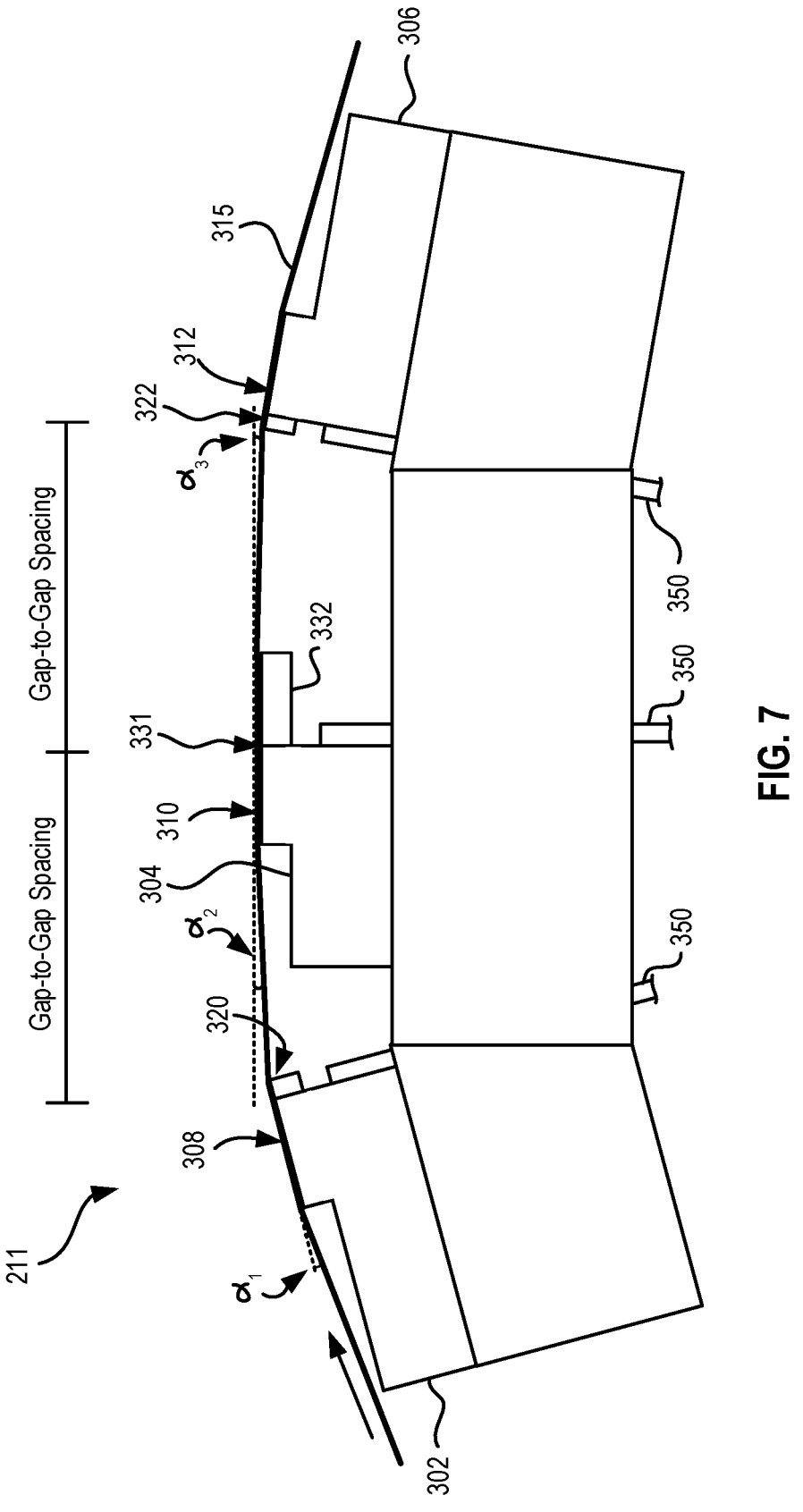
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
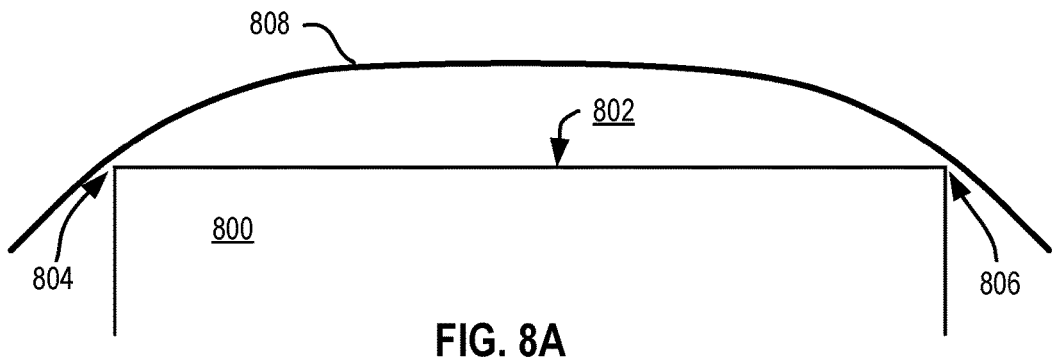
FIGS. 8A-8C are schematics depicting the principles of tape tenting.
Figure 8B:
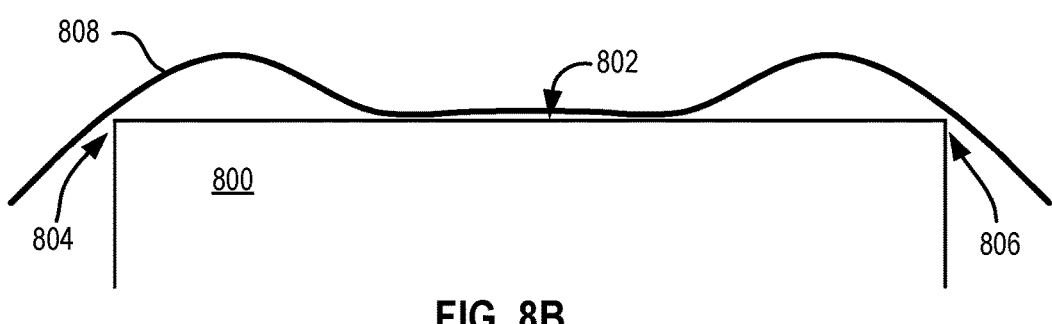
Figure 8C:
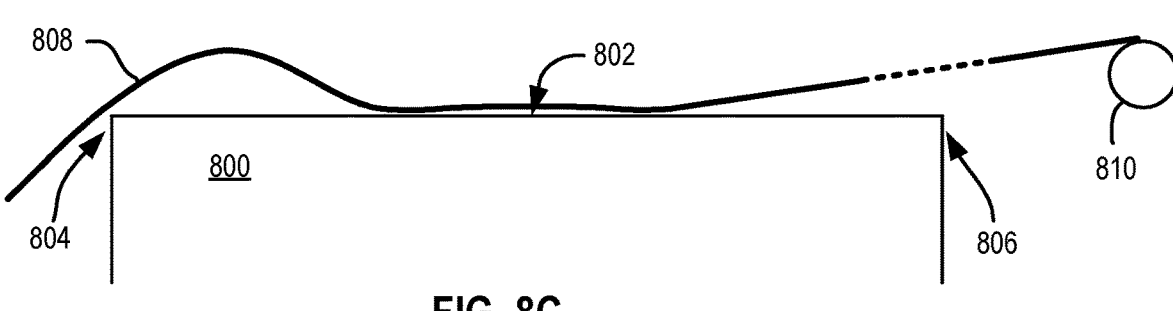

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
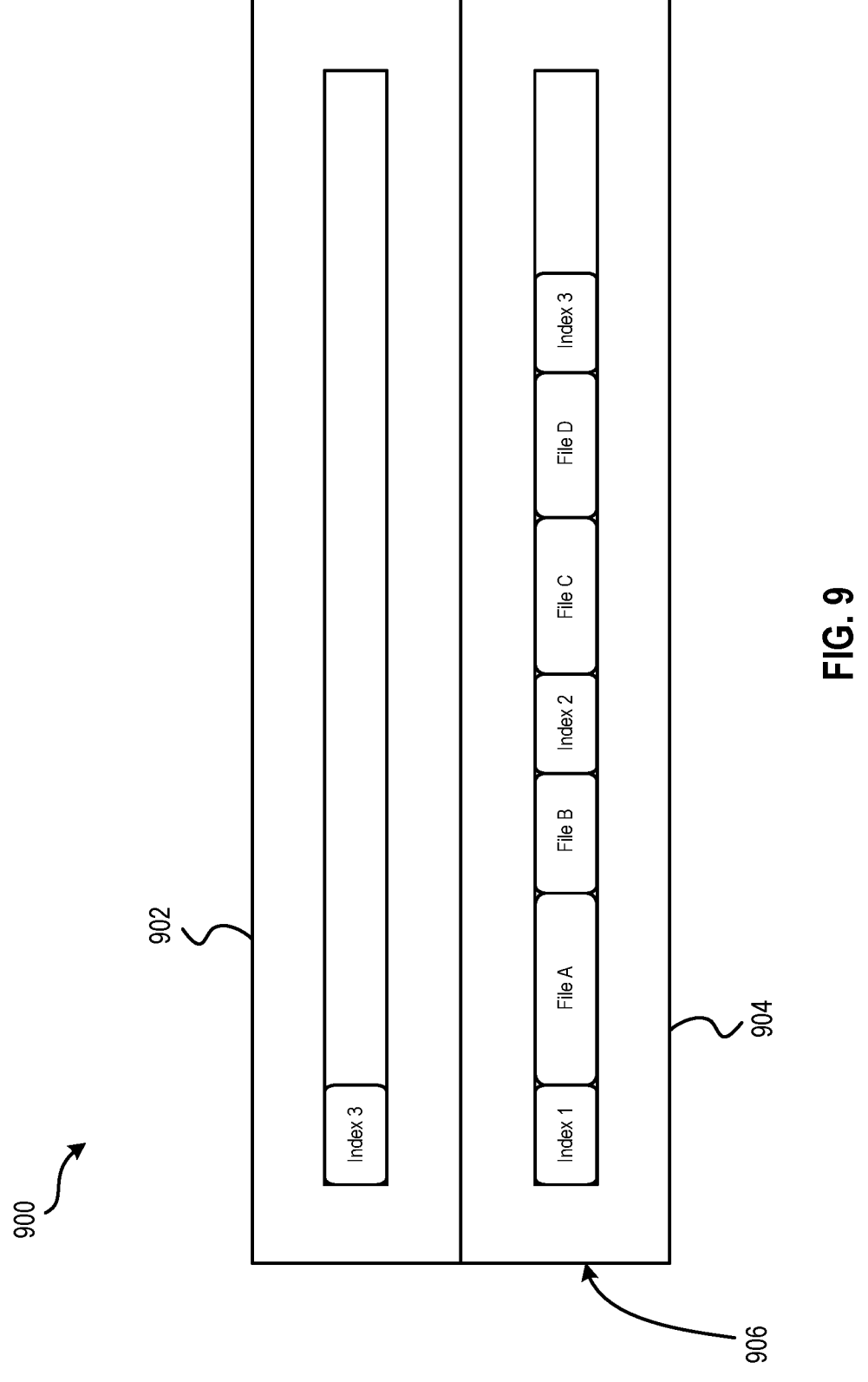
FIG. 9 is a representational diagram of files and indexes stored on a magnetic tape, in accordance with one embodiment.

Looking to FIG. 9, a magnetic tape 900 having an index partition 902 and a data partition 904 is illustrated, according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

An ongoing issue with magnetic tape recording is dealing with debris. In a typical magnetic recording tape, a magnetic substance, such as iron particles, is adhered along the surface of the tape. During read/write operations, the magnetic tape is run across the magnetic head under controlled tension. During use, the magnetic substances sometimes come unstuck unexpectedly and accumulate on the tape surface and/or the surface of the magnetic head. Chunks of the magnetic substance are called debris.

Once debris adheres to the write transducers, it becomes more difficult for the drive to write data to the tape using the head. In some cases, a write transducer may not be able to correctly write magnetic transitions onto the tape. Currently, tape drives have 32 write transducers placed in parallel, and data is written from them simultaneously. When debris accumulation and/or other problem causes one or more of the write transducers in the array to become ineffective, the tape drive may implement a mechanism to rewrite the data that was not written successfully, e.g., using other write transducers. Thus, the data written will not be unreadable. However, when one or more write transducers are ineffective at properly writing, this rewrite operation occurs frequently, and sometimes on an ongoing basis, reducing the total amount of data that can be written to the tape.

Similarly, once debris adheres to the read transducers, it becomes more difficult to read data using the head, both during normal readback and during read-while-write. When the tape drive writes data to the tape, it adds error correction code (ECC) for redundancy. If the number of unreadable data tracks due to debris is within correctable range, the drive still can read the data. But as more and more debris accumulates on the array of read transducers, eventually the data will not be able to be read in one attempt. In this case, the tape drive repeats the reading attempts at the same data by changing a variety of settings repeatedly. This operation is called as an Error Recovery Procedure (ERP). Executing ERPs, the drive is typically able to read the unreadable data. However, ERPs take time to perform, resulting in poor drive performance.

Debris may also adhere to the surface of the tape. Often when debris adheres to the tape surface, the drive cannot read back the data written in the vicinity of the debris, and/or the drive cannot write new data at that tape location. If the drive cannot write data at the location of the debris, the drive moves the writing position to a place on the tape that does not have debris adhered thereto. If the drive cannot read back data due to debris on the tape, the drive performs a sequence of the read ERPs until the data can be read. In a few instances, the debris on the tape may come unstuck by contacting with the head, but often it does not.

Some kinds of ERPs do not read or write on the tape but rather rewind the tape, and thereafter unmount and remount the cartridge from the drive. This is called a rechuck. The purpose of this ERP was originally to reengage the gear of the tape cartridge on the tape drive. Nowadays, the tape drive and tape cartridge are precisely manufactured, such that the rechuck is not typically used for reengaging the gear in state of the art drives. Instead, this type of ERP may be used to remove debris on the tape head because the brush that is embedded in the tape drive wipes the head surface during rechucking.

A drawback of the rechuck ERP is that it requires the drive to rewind the tape to the beginning of the tape (BOT). This operation takes a relatively long time, thereby causing severely degraded read/write performance. Current tape drives repeat read ERPs with a variety of drive settings sometimes several dozens of times, followed by a rechuck ERP. For example, in conventional ERP, a procedure which necessitates rewinding of a tape such as rechuck is carried out at or near the end of many ERP, e.g., up to about eighty procedures in some cases. For example, to perform rechuck in current products, it is necessary to rewind a tape to unload and reload a cartridge and further requires returning to a position of reading, which may take approximately five minutes. For this reason, ERP that includes a rechuck, has been conducted at the end of all ERP sequences to avoid deterioration in performance.

Various embodiments described herein revolve around a method of changing the ERP order depending upon humidity level.

There is a relationship between humidity and how debris adheres to the head or magnetic tape. The best humidity to preserve a magnetic tape is around 50%. It is also known that the humidity outside of the range between 20% and 80% deforms the tape medium and makes it difficult to read or write data, e.g., due to tape lateral expansion or contraction. Current study shows debris tends to adhere to the head when the humidity is low and tends to adhere to the tape when the humidity is high.

In a general embodiment, the environment humidity in the vicinity of the tape drive is measured. When the humidity is higher or lower, a particular order of performing ERPs is selected based on the humidity level in an effort to resolve the most likely type of failure early in a sequence of ERPs.

Thus, the tape drive may change a default sequence of ERPs to perform depending upon the environmental humidity. When the humidity is higher, the debris has a tendency adhere to the tape medium. In this case, the tape drive may perform ERPs which are effective to remove debris from the tape medium. When the humidity is lower, debris has a tendency to adhere to the magnetic head. In this case, the tape drive may perform ERPs which are effective to remove debris from the magnetic head, preferentially at a stage as early as possible by brushing the head or the like.

The uniquely ordered ERP sequences described herein overcome a drawback with known ERP sequences, which may not only fail to remove debris considered to have adhered to a head but damage the surface of a tape due to debris adhering to a head, or cause debris adhering to a head to be removed and become deposited and adhered to a tape. The latter case is undesirable because when the surface of a tape is damaged, it may become impossible to read data stored in the damaged area.

Figure 10:
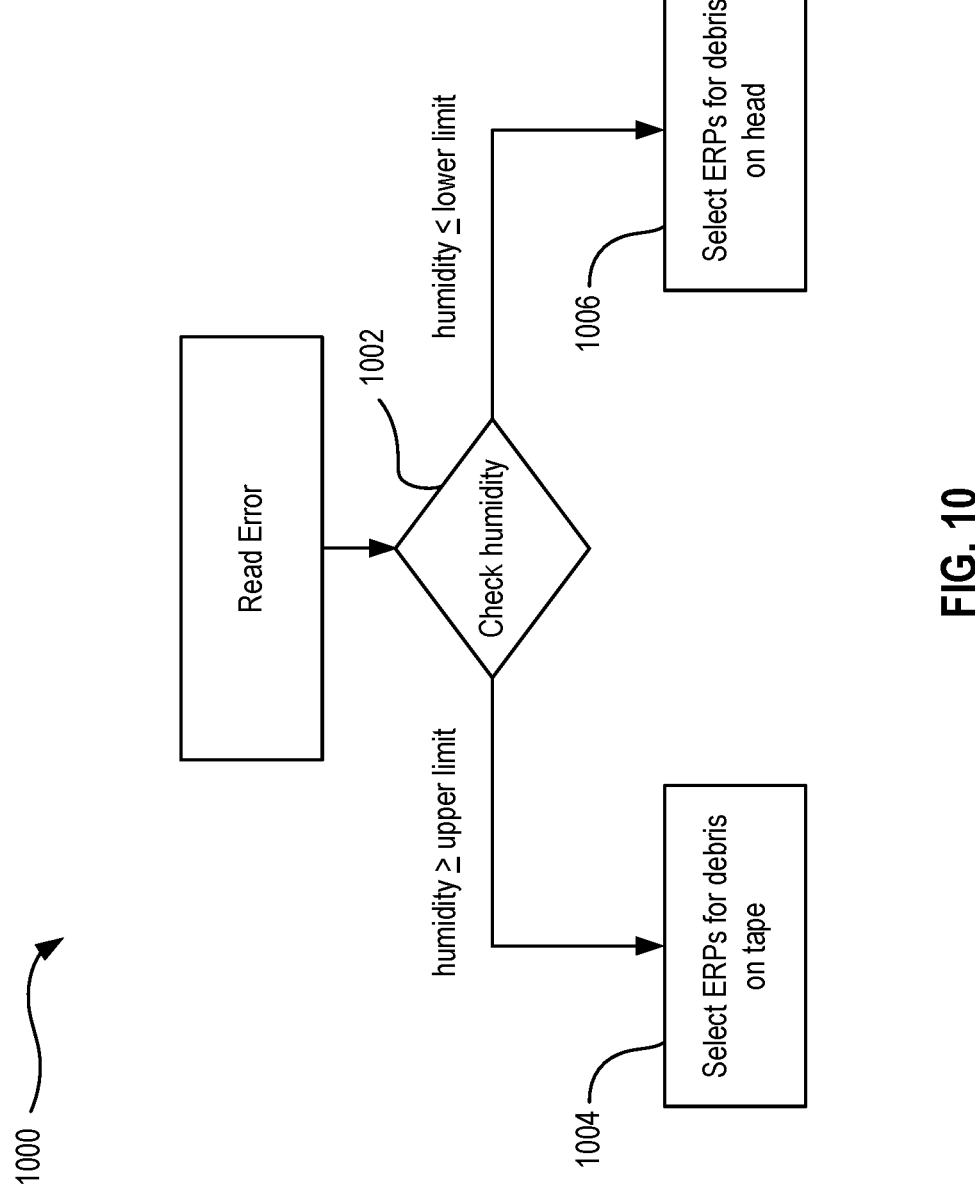
FIG. 10 is a flow diagram of a method, in accordance with one embodiment.

Now referring to FIG. 10, a flowchart of a method 1000 is shown according to one embodiment. The method 1000 may be performed in accordance with the present invention in any of the environments depicted in FIGS. 1-9 and 11, among others, in various embodiments. Of course, more or fewer operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a tape drive, a tape library, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002 where humidity in a vicinity of a tape drive is measured in response to occurrence of an error encountered while performing a data operation on a magnetic recording tape. The humidity may be measured using any type of mechanism. For example, the tape drive may include a humidity sensor for measuring a humidity level in and/or outside the tape drive, the measurements of which can be used. In another approach, a humidity sensor of a tape library may be used. In yet another approach, readings from a humidity sensor in a room housing the tape drive may be used. The humidity values are preferably collected in terms of relative humidity, though other types of humidity values may be used in other embodiments.

If the measured humidity exceeds a predefined upper limit value, one or more ERPs are executed to remove debris on the tape in operation 1004. Preferably, the predefined upper limit value is greater than 75% humidity, and ideally greater than or equal to 80% humidity.

Preferably, an ERP to remove debris on the tape is the first ERP performed, at least for an area of the tape corresponding to a location of the error, in response to detecting the error and the measured humidity exceeding the predefined upper limit value. In other approaches, the ERP to remove debris on the tape is one of the first ERPs (e.g., one of the first five ERPs) to be performed, e.g., it is injected into a default ERP sequence so that it is one of the first ERPs performed. In a further approach, at least two ERPs directed at removing debris from the tape may be performed as two of the first ERPs attempted to resolve the error.

Any type of ERP capable of removing debris from a tape may be performed. In one approach, the ERP includes a rechuck. In another approach, the ERP includes increasing a tension on the tape as it passes across the head in an attempt to break the debris free by passing the tape at higher tension over the guides and/or tape head (e.g., a skiving edge of the tape head). The tape speed may be slowed, relative to usual read/write tape speeds, during the ERP to prevent damage to the guides and/or tape head by impact of the debris thereagainst.

If, after performing the ERP to remove the debris from the tape did not resolve the error, a default sequence of other ERPs is preferably performed.

If the measured humidity is below a predefined lower limit value, one or more ERPs to remove debris adhering to a magnetic head of the tape drive are executed in operation 1006. Preferably, the predefined lower limit value is less than 25% humidity, and ideally less than or equal to 20% humidity.

Preferably, an ERP to remove debris from the magnetic head is the first error recovery procedure performed in response to detecting the error and the measured humidity being below the predefined upper limit value. In a further approach, at least two ERPs directed at removing debris from the magnetic head may be performed as two of the first ERPs attempted to resolve the error.

Any type of ERP capable of removing debris from a magnetic head may be performed. Preferably, an ERP to remove debris adhering to the magnetic head includes brushing the magnetic head. Ideally, the tape drive is configured to brush the magnetic head without winding the tape, e.g., the drive is capable of brushing the head without respooling the tape. In such embodiments, application of brushing to heads at an early stage does not significantly affect performance and makes no difference to other types of ERP. This in turn achieves the benefit of removing debris and avoiding, in advance, problems such as damaging media due to debris being left untreated and/or leaving debris adhering to a head which could ultimately become adhered to a tape. However, in another approach, the ERP may include a rechuck, which includes brushing.

If performing the ERP to remove the debris from the head did not resolve the error, a default sequence of other ERPs is preferably performed.

In a preferred embodiment, a default ERP sequence is executed in response to detection of an error and the measured humidity being between the upper and lower limit values. The default ERP sequence can be any sequence of ERPs known in the art.

Moreover, the ERPs in the default sequence may be of any type known in the art. Illustrative ERPs usable in the course of recovering the correct encode of a given dataset may include a wide range of optional sub-operations, such as recalibration of recording and servo channels; tape repositioning; cartridge reloading; re-reading with alternate servo, dataflow, speed, or channel settings; etc. Moreover, in some embodiments, these options may be dynamically selected based on a detected error signature. Some ERPs may include multiple retries to read the data, each try with different operational settings. Each retry requires a backhitch in order to reposition for a different recovery attempt.

If none of the ERPs are able to resolve the error, the error may be deemed an unrecoverable error, and any technique for handling an unrecoverable error that would become apparent to one skilled in the art upon reading the present disclosure may be performed. Exemplary techniques for handling unrecoverable errors may include one or a combination of: marking a location of the error on the tape itself as unusable, e.g., by making a notation in cartridge memory and/or an index; notifying a user and/or storage controller of the error; unloading the tape; disabling the drive from performing further operations; etc.

Figure 11:
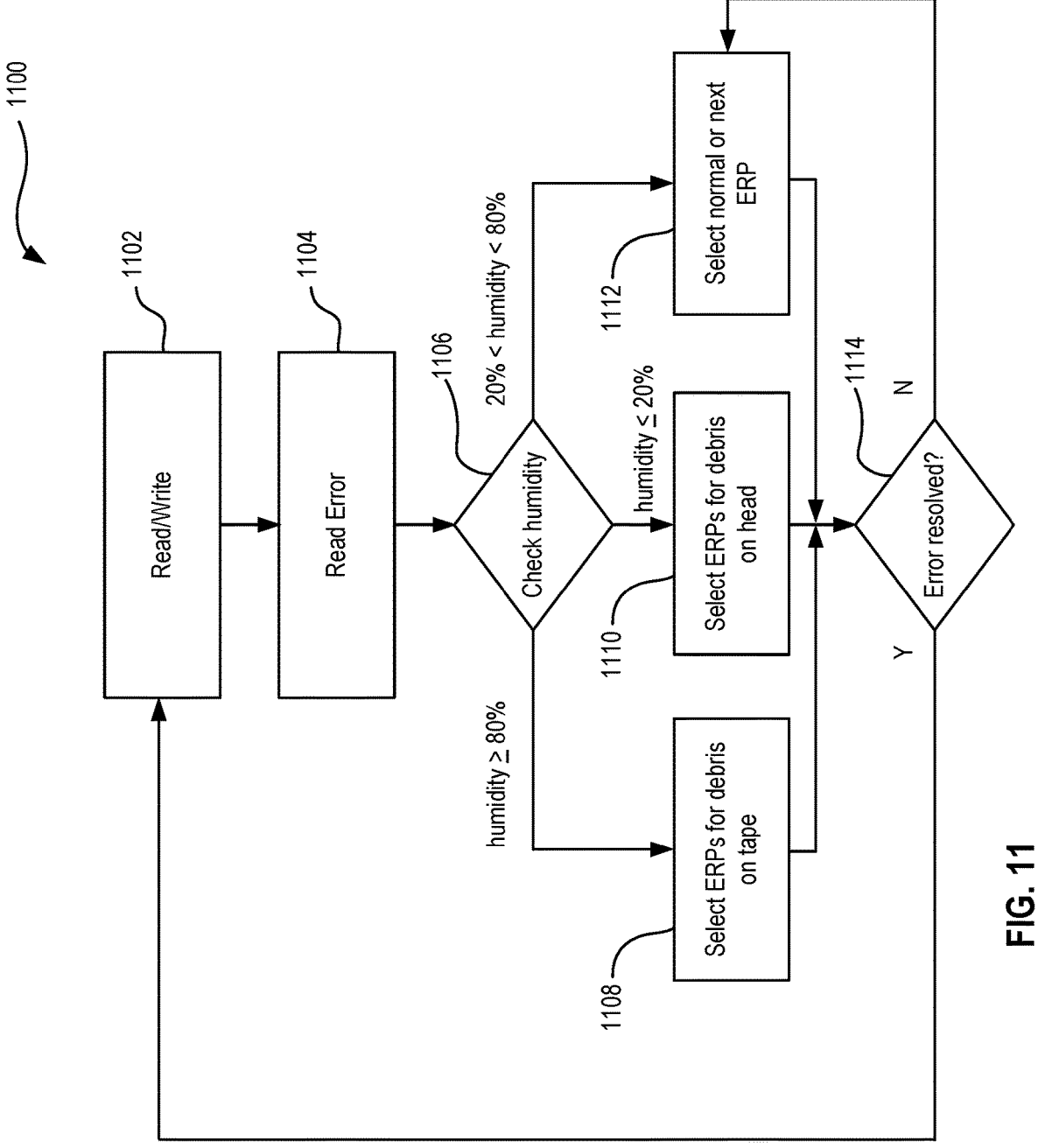
FIG. 11 is a flow diagram of a method, in accordance with one exemplary embodiment.

Now referring to FIG. 11, a flowchart of a method 1100 is shown, according to one illustrative embodiment. The method 1100 may be performed in accordance with the present invention in any of the environments depicted in FIGS. 1-10, among others, in various embodiments. Of course, more or fewer operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a tape drive, a tape library, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where a read/write operation is performed, such as reading, writing, etc.

In operation 1104, a read error is detected.

In operation 1106, the humidity in the vicinity of the tape drive is checked.

If the humidity is greater than or equal to 80%, one or more ERPs for removing debris from the tape are performed in operation 1108.

If the humidity is less than or equal to 20%, one or more ERPs for removing debris from the head are performed in operation 1110.

If the humidity is between 20% and 80%, one or more "normal" ERPs from the default ERP sequence are performed in operation 1112.

At decision 1114, a determination is made as to whether the error is resolved. If the error is resolved, the process returns to operation 1102 for normal reading and/or writing operations to resume. If the error is not resolved, the next ERP in the default sequence is performed in an effort to resolve the error.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a magnetic head; and
a controller coupled to the magnetic head, the controller being configured to perform a method comprising:
measuring humidity in a vicinity of the apparatus in response to detection of an error while performing a data operation on a magnetic recording tape;

executing an error recovery procedure to remove debris on the tape in response to detection of an error and the measured humidity exceeding a predefined upper limit value; and
executing an error recovery procedure to remove debris adhering to the magnetic head in response to detection of an error and the measured humidity being below a predefined lower limit value.

2. An apparatus as recited in claim 1, wherein the predefined upper limit value is greater than 75% humidity, wherein the predefined lower limit value is less than 25% humidity.

3. An apparatus as recited in claim 1, wherein the error recovery procedure to remove debris adhering to the magnetic head includes brushing the magnetic head.

4. An apparatus as recited in claim 3, wherein the apparatus is configured to brush the magnetic head without winding the tape.

5. An apparatus as recited in claim 1, comprising executing a default error recovery procedure sequence in response to detection of an error and the measured humidity is between the limit values.

6. An apparatus as recited in claim 1, wherein the error recovery procedure to remove debris on the tape is the first error recovery procedure performed, at least for an area of the tape corresponding to a location of the error, in response to detecting the error and the measured humidity exceeding the predefined upper limit value; and wherein a default sequence of other error recovery procedures is performed in response to determining that the error recovery procedure to remove debris on the tape did not resolve the error.

7. An apparatus as recited in claim 1, wherein the error recovery procedure to remove debris from the magnetic head is the first error recovery procedure performed in response to detecting the error and the measured humidity being below the predefined upper limit value; and wherein a default sequence of other error recovery procedures is performed in response to determining that the error recovery procedure to remove debris from the magnetic head did not resolve the error.

8. A method, comprising:
measuring humidity in a vicinity of a tape drive in response to occurrence of an error while performing a data operation on a magnetic recording tape;
executing an error recovery procedure to remove debris on the tape in response to the measured humidity exceeding a predefined upper limit value; and
executing an error recovery procedure to remove debris adhering to a magnetic head of the tape drive in response to the measured humidity being below a predefined lower limit value.

9. A method as recited in claim 8, wherein the predefined upper limit value is greater than 75% humidity, wherein the predefined lower limit value is less than 25% humidity.

10. A method as recited in claim 8, wherein the error recovery procedure to remove debris adhering to the magnetic head includes brushing the magnetic head.

11. A method as recited in claim 10, wherein the tape drive is configured to brush the magnetic head without winding the tape.

12. A method as recited in claim 8, comprising executing a default error recovery procedure sequence in response to detection of an error and the measured humidity is between the limit values.

13. A method as recited in claim 8, wherein the error recovery procedure to remove debris on the tape is the first error recovery procedure performed, at least for an area of the tape corresponding to a location of the error, in response to detecting the error and the measured humidity exceeding the predefined upper limit value; and wherein a default sequence of other error recovery procedures is performed in response to determining that the error recovery procedure to remove debris on the tape did not resolve the error.

14. A method as recited in claim 8, wherein the error recovery procedure to remove debris from the magnetic head is the first error recovery procedure performed in response to detecting the error and the measured humidity being below the predefined upper limit value; and wherein a default sequence of other error recovery procedures is performed in response to determining that the error recovery procedure to remove debris from the magnetic head did not resolve the error.

15. A computer program product for selecting an error recovery procedure, the computer program product comprising:

one or more computer readable storage media, and program instructions collectively stored on the one or more computer readable storage media, the program instructions comprising:

program instructions to measure humidity in a vicinity of a tape drive in response to occurrence of an error while performing a data operation on a magnetic recording tape;

program instructions to execute an error recovery procedure to remove debris on the tape in response to the measured humidity exceeding a predefined upper limit value; and program instructions to execute an error recovery procedure to remove debris adhering to a magnetic head of the tape drive in response to the measured humidity being below a predefined lower limit value.

16. A computer program product as recited in claim 15, wherein the predefined upper limit value is greater than 75% humidity, wherein the predefined lower limit value is less than 25% humidity.

17. A computer program product as recited in claim 15, wherein the error recovery procedure to remove debris adhering to the magnetic head includes brushing the magnetic head.

18. A computer program product as recited in claim 17, wherein the tape drive is configured to brush the magnetic head without winding the tape.

19. A computer program product as recited in claim 15, comprising program instructions to execute a default error recovery procedure sequence in response to detection of an error and the measured humidity is between the limit values.

20. A computer program product as recited in claim 15, wherein the error recovery procedure to remove debris on the tape is the first error recovery procedure performed, at least for an area of the tape corresponding to a location of the error, in response to detecting the error and the measured humidity exceeding the predefined upper limit value; and wherein a default sequence of other error recovery procedures is performed in response to determining that the error recovery procedure to remove debris on the tape did not resolve the error, wherein the error recovery procedure to remove debris from the magnetic head is the first error recovery procedure performed in response to detecting the error and the measured humidity being below the predefined upper limit value; and wherein a default sequence of other error recovery procedures is performed in response to determining that the error recovery procedure to remove debris from the magnetic head did not resolve the error.

* * * * *